United States Patent Office
3,244,750
Patented Apr. 5, 1966

3,244,750
N,N'-DISUBSTITUTED-ALIPHATIC-BIS-AMINO-METHYL-CYCLOHEXANE DERIVATIVES
Leslie G. Humber, Montreal, Quebec, Canada, assignor to American Home Products Corporation, New York, N.Y., a corporation of Delaware
No Drawing. Filed Dec. 6, 1963, Ser. No. 328,521
14 Claims. (Cl. 260—563)

This invention relates to novel chemical compounds, certain new derivatives of cyclohexane, and to the process utilized in their preparation. More particularly, my invention relates to alkyl, cycloalkyl, bicycloalkyl, cycloalkylalkyl, alkenyl, bicycloalkenyl, and cycloalkenylalkyl derivatives of cyclohexane, which new chemical compounds possess valuable pharmacological properties.

This invention also relates to new intermediates in the preparation of said pharamacologically active compounds.

The new pharmacologically active compounds, in base form, may be generically represented by the Formula I:

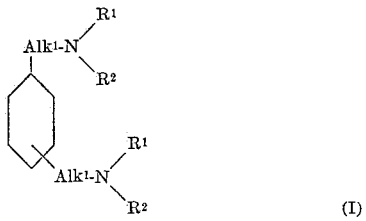

(I)

wherein, when $R^1$ is hydrogen, $R^2$ may be alkyl, cycloalkyl, which may also be substituted with hydroxyl or halogen groups, bicycloalkyl, cycloalkylalkyl, alkenyl, bicycloalkenyl or cycloalkenylalkyl. Alternatively $R^1$ and $R^2$ together may represent an alkylene group. $Alk^1$ represents a straight or branched alkylene chain containing from one to three carbon atoms. Moreover, the substituents on the cyclohexane ring are in the 1,3- or 1,4-position and may be either cis or trans to each other. These compounds, being basic in nature, form tertiary acid addition salts. Such acid addition salts with pharmacologically acceptable acids are biologically equivalent to the free bases, and constitute a preferred form for the administration of the compounds of my invention.

The new pharmacologically active compounds forming the subject of this invention are useful both as antibacterial agents and for lowering cholesterol levels in the blood. For example, they will lower cholesterol blood levels in the intact rat by highly significant degrees when administered orally in small doses. They are also effective as antibacterial agents, against both gram positive and gram negative organisms.

Data respecting these activities of individual chemical compounds within the scope of my invention, as defined by the generic formula given above, will be found subsequently in this disclosure.

As agents for lowering cholesterol levels in blood, the active compounds of this invention may be administered both orally or by injection. For oral administration, the active compounds of this invention, either as the free bases or in the form of pharmacologically acceptable salts, may be formulated in solid dosage forms such as, tablets or capsules, together with carriers such as e.g., lactose, starch, magnesium stearate, and the like. For administration by injection, the active compounds of this invention are preferably used in the form of one of their pharmacologically acceptable salts, dissolved in a suitable aqueous vehicle. Both oral dosage forms and dosage forms for injection may be formulated to contain from 5 to 500 mg. of the active ingredient.

As antibacterial agents, the active compounds of this invention may be administered in formulations containing the usual percutaneous pharmaceutical carriers, e.g. in solutions containing from 0.1 to 5.0% of the active ingredient in the form of a water soluble pharmacologically acceptable salt.

The present invention further consists in a generic aspect, in a process for preparing a disubstituted cyclohexane derivative of the Formula I. Thus, the class of cyclohexane derivatives defined above by the generic Formula I are prepared in accordance with the invention as follows:

(1) one molar equivalent of a compound of the formula:

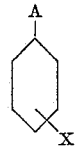

wherein A may be attached to the cyclohexane ring in the 1,3- or 1,4-positions and is a member selected from the group consisting of $Alk^1$-$NH_2$ and $Alk^2$-CO—X wherein $Alk^1$ has the significance defined above, $Alk^2$ represents a valency bond or a straight or branched alkylene chain containing from one to two carbon atoms, and X is halogen, is reacted with two molar equivalents of a compound of the formula B where B represents $R^3$—CO—$R^4$ when A is $Alk^1$-$NH_2$ wherein $R^3$ may be halogen or hydrogen and $R^4$ is a member of the group consisting of alkyl, cycloalkyl, cycloalkenyl, alkenyl and cycloalkylalkyl or $R^3$ and $R^4$ together may represent a straight or branched alkylene chain, an hydroxyl-substituted alkylene chain or a cycloalkylalkylene group; and A is $Alk^2$—CO—X when B represents a group $R^5$—NH—$R^6$ wherein $R^5$ is hydrogen and $R^6$ is selected from the group consisting of alkyl, cycloalkyl and bicycloalkenylalkyl radicals, or $R^5$ and $R^6$ together may represent an alkylene group, to obtain an amide or a Schiff base of the Formla II.

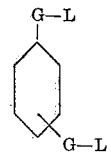

(II wherein G may be attached to the cyclohexane ring in the 1,3- or 1,4-positions and represents $Alk^1$—N= when L is a member of the group consisting of alkylidine, cycloalkylidine, cycloalkylalkylidine, cycloalkenylalkylidine, alkenylidine and bicycloalkylidine, G represents $Ak^1$—NH—CO when L is a member of the group consisting of cycloalkyl, cycloalkylalkyl and cycloalkenyl radicals, and G represents CO—N when

wherein $R^5$ and $R^6$ have the significance noted above;

(2) Reducing said amide or Schiff base with a reducing agent to the corresponding disubstituted cyclohexane derivative of Formula I, and, if desired, transforming said disubstituted cyclohexane derivative into a pharmacologically acceptable acid addition salt thereof.

More specifically, the procedure for preparing the new chemical compounds may be described as follows:

A suitable alkyl, cycloalkyl, cycloalkylalkyl, alkenyl, cycloalkenyl aldehyde or a siutable cycloalkanone, substituted cycloalkanone or a bicycloalkanone is caused to react with a cyclohexane-1,3- or 1,4-bis-alkylamine by bringing the two reactants together, at a suitable temperature, preferably and, if necessary, in the presence of an inert solvent. A preferred solvent in this reaction is benzene. A preferred temperature is the temperature of reflux of the reaction mixture. This results in condensation to form the corresponding Schiff base, with elimination of two molecules of water which are conveniently removed, preferably by azeotropic distillation.

The resulting Schiff base is then reduced to the corresponding amino compound. Convenient reducing agents include lithium aluminium hydride in an inert solvent such as ethers or cyclic ethers, sodium borohydride in alcoholic solution and catalytic hydrogenation. This reduction is preferably carried out with sodium borohydride in methanolic solution. The free base is then recovered, preferably by evaporation of the solvent, yielding an oily product.

Alternatively, a suitably substituted acid halide is caused to react with a cyclohexane-1,3- or 1,4-bis-alkylamine at a suitable temperature, and in the presence of an acid acceptor. A preferred acid acceptor in this reaction is sodium hydroxide and a preferred temperature is the temperature of reflux of the reaction mixture. The reaction is conveniently carried out in aqueous solution.

The resulting diamide is reduced by reaction with a reducing agent in an inert solvent selected from the group consisting of ethers and cyclic ethers to the corresponding diamino compound. Preferred reducing agents include lithium aluminium hydride or hydrogen in the presence of a noble metal catalyst. A preferred solvent is tetrahydrofuran. This reduction is effected at a temperature up to the temperature of reflux of the resulting mixture. The free base is then recovered by evaporation of the solvent.

Alternatively, a suitable alkyl, cycloalkyl, cycloalkylalkyl, bicycloalkenylalkyl, alkenyl or cycloalkenylalkyl amine is caused to react with a cyclohexane-1,3- or 1,4-dicarbonyl halide, or a cyclohexane-1,3- or 1,4-di-(alkylcarbonyl)-halide at a suitable temperature and in a suitable inert solvent. A preferred solvent is benzene and a preferred temperature is that of the refluxing reaction mixture. An excess of the amine is used as an acid acceptor to remove the hydrogen halide which is split out in the reaction. This results in condensation to form the corresponding diamide. The resulting diamide is then reduced to the corresponding diamine, the reduction being preferably carried out as described above.

Details of these processes, as applied to the preparation of specific chemical compounds within the scope of my invention, are given below.

When utilized as agents for lowering the cholesterol levels in blood the following values illustrate the extent of such lowering at various dose levels.

TABLE A

| Compound | Dose Level (Micromoles/Kg.) Orally | Lowering of Cholesterol Levels |
|---|---|---|
| I | 5 | 54% |
| II | 10 | 72% |
| III | 10 | 47% |
| IV | 75 | 67% |
| V | 75 | 73% |
| VI | 75 | 69% |
| VII | 75 | 11% |
| VIII | 75 | 10% |
| IX | 75 | 49% |

In this table:

Compound I is trans-1,4-bis(cyclohexylmethylaminomethyl)-cyclohexane.

Compound II is cis-1,4-bis(cyclohexylmethylaminomethyl)-cyclohexane.

Compound III is 1,4-bis(3-cyclohexenylmethylaminomethyl)-cyclohexane.

Compound IV is N,N'-diisobutylcyclohexane-1,4-bismethylamine.

Compound V is N,N'-diisovalerylcyclohexane-1,4-bismethylamine.

Compound VI is N,N'-dicyclohexyl-trans-1,4-cyclohexane bismethylamine.

Compound VII is N,N'-di(cyclohexylpropyl)-cyclohexane-1,4-bismethylamine.

Compound VIII is a mixture of N,N'-bis(3,7-dimethyl-6-octenyl)-cyclohexane-1,4-bismethylamine and N,N'-bis(3,7-dimethyl-7-octenyl)-cyclohexane - 1,4-bismethylamine.

Compound IX is trans-1,4-bis(hexamethyleneiminomethyl)-cyclohexane.

As illustrative of the activity of the compounds as antibacterial agents certain of the compounds were effective against the specified microorganisms at the dilutions stated in the following table.

TABLE B

Antibacterial activity (1/MIC)

| Organisms | Compound | | | |
|---|---|---|---|---|
| | I | II | IV | VII |
| Staph. pyogenes S [1] | 10,000 | 10,000 | 10,000 | 320,000 |
| Staph. pyogenes R [2] | 10,000 | 10,000 | 10,000 | 320,000 |
| Sarcina lutea | 10,000 | 20,000 | 10,000 | 640,000 |
| Strept. faecalis | 10,000 | 10,000 | 10,000 | 160,000 |
| E. coli, 198 | 10,000 | 10,000 | 10,000 | 160,000 |
| A. aerogenes | 10,000 | 10,000 | 10,000 | 80,000 |
| S. pullorum | 40,000 | 10,000 | 10,000 | 160,000 |
| Ps. aeruginosa | 10,000 | 10,000 | 10,000 | 20,000 |
| Pr. mirabilis | 10,000 | 10,000 | 10,000 | 10,000 |
| Pr. vulgaris | 10,000 | 10,000 | 10,000 | 10,000 |

[1] Penicillin-sensitive strain.
[2] Penicillin-resistant strain.

The following examples, while not intended to limit the scope of our invention, may serve as illustrations thereof.

EXAMPLE 1

Trans-1,4-bis-(cyclohexylmethylaminomethyl)-cyclohexane

A solution of trans-1,4-bis(aminomethyl)-cyclohexane (3.17 gm., 0.022 mole) and cyclohexane carboxaldehyde (5.0 gm., 0.044 mole) in benzene, were refluxed for three hours. The solvent was evaporated to yield, quantitatively, the corresponding Schiff base. It had a sharp band in the infra red spectrum at 1666 cm.$^{-1}$. It was dissolved in methanol (150 ml.) and treated portionwise with sodium borohydride (2.5 gm., 0.066 mole). The resulting solution was refluxed overnight then evaporated to yield a residue which was distributed between benzene and water. The benzene layer was dried and evaporated to yield the title compound as an oil with bands in the infra red at 2920 cm.$^{-1}$.

A dihydrochloride salt was prepared in the usual manner and crystallized from methanol. It had M.P. 360° C.

Analysis confirmed the empirical formula $C_{22}H_{44}N_2Cl_2$.

EXAMPLE 2

N,N'-di-(cyclohexanecarbonyl)-trans-1,4-bis-(aminomethyl)-cyclohexane

To a solution of trans-1,4-(aminomethyl)-cyclohexane (14.2 gm., 0.1 mole) in aqueous sodium hydroxide (210 ml. of 1.0 N) was added dropwise with vigorous stirring, cyclohexanecarbonyl chloride (29.2 gm., 0.2 mole). The mixture was refluxed for 2 hours, cooled and filtered to yield a white solid which was thoroughly washed with water and crystallized from methanol to yield the title compound M.P. 288–289° C.

Analysis confirmed the empirical formula $C_{22}H_{38}N_2O_2$.

EXAMPLE 3

*Trans-1,4-bis(cyclohexylmethylaminomethyl)-cyclohexane*

The diamide of Example 2 (11.0 gm.) was added in portions to a suspension of lithium aluminium hydride (3.4 gm.) in anhydrous tetrahydrofuran. The resulting mixture was refluxed for 24 hours, cooled and treated cautiously with water (14.0 ml.). The solids were removed by filtration and the filtrate evaporated to yield the title compound as an oil with bands in the infra red at 2920 cm.$^{-1}$ and 1455 cm.$^{-1}$. The dihydrochloride salt was prepared in the usual manner and had M.P. >360° C.

Analysis confirmed the empirical formula $C_{22}H_{44}N_2Cl_2$.

EXAMPLE 4

*N,N'-di-(cyclohexanecarbonyl)-cis-1,4-bis-(aminomethyl)-cyclohexane*

A solution of cis-1,4-bis-(aminomethyl)-cyclohexane (14.2 gm., 0.1 mole) in aqueous sodium hydroxide (210 ml. of 1.0 N) was treated with cyclohexane carbonyl chloride (29.2 gm., 0.2 mole) as described in Example 2 for the corresponding trans derivative. The diamide was obtained crystalline from methanol, and had M.P. 214–215° C.

Analysis confirmed the empirical formula $C_{22}H_{38}N_2O_2$.

EXAMPLE 5

*Cis-1,4-bis-(cyclohexylmethylaminomethyl)-cyclohexane*

The diamide of Example 4 (14.0 gm.) was reduced with lithium aluminium hydride (4.6 gm.) in tetrahydrofuran solution as described in Example 3 for the corresponding trans isomer.

The title compound was obtained as a semi solid material. It had bands in the infra red at 2920 cm.$^{-1}$ and 1455 cm.$^{-1}$.

The dihydrochloride salt was prepared in the usual manner and crystallized from methanol. It had M.P. >360° C.

Analysis confirmed the empirical formula $C_{22}H_{44}N_2Cl_2$.

EXAMPLE 6

*1,4-bis(3-cyclohexenylmethylaminomethyl)-cyclohexane*

3-cyclohexenylcarboxaldehyde (12.0 gm.) and 1,4-bis-aminomethyl-cyclohexane (7.1 gm.) were refluxed in benzene for three hours. The resulting Schiff base, a yellow oil (18.4 gm.) was dissolved in methanol and reduced with sodium borohydride (14.2 gm.) to yield the title compound. It had max. .278 mµ (ϵ=18). A dihydrochloride salt was prepared with ethereal hydrogen chloride. It was crystallized from hot methanol and had M.P. >360° C.

Analysis confirmed the empirical formula $C_{22}H_{40}N_2Cl_2$.

EXAMPLE 7

*N,N'-diisobutylcyclohexane-1,4-bismethylamine*

Cyclohexane-1,4-bismethylamine (28.45 gm., 0.2 mole) and isobutyraldehyde (28.8 gm., 0.4 mole) were dissolved in benzene (200 ml.) and refluxed until the theoretical volume of water had been collected in a Dean-Stark trap. The benzene was evaporated in vacuo and the resultant Schiff's base, an oil, was dissolved in methanol and reduced with sodium borohydride (15.1 gm., 0.4 mole) to yield the title compound as an oil. It had bands in the infra red spectrum at 2948 cm.$^{-1}$, 1475 cm.$^{-1}$ and 1452 cm$^{-1}$.

The dihydrochloride salt was prepared with ethereal hydrogen chloride and was crystallized from ethanol. It had M.P. >320° C.

Analysis confirmed the empirical formula $C_{16}H_{36}N_2Cl_2$.

EXAMPLE 8

*N,N'-diisovalerylcyclohexane-1,4-bismethylamine*

Cyclohexane-1,4-bismethylamine and isovaleraldehyde were converted to the Schiff's base and reduced to the diamine by the method described in Example 7. The title compound was obtained as an oil which had bands in the infra red at 2950 cm.$^{-1}$, 1465 cm.$^{-1}$ and 1450 cm.$^{-1}$. The dihydrochloride salt was prepared in the usual manner and was crystallized from absolute ethanol. It had M.P. >320° C.

Analysis confirmed the empirical formula $C_{18}H_{40}N_2Cl_2$.

EXAMPLE 9

*N,N'-bis(3,7-dimethyl-6-(and 7)-octenyl)-cyclohexane-1,4-bismethylamine*

1,4-bisaminomethylcyclohexane (0.1 mole) and citronella (0.2 mole) were converted to the Schiff's base in benzene solution. It was obtained as a light yellow oil and was dissolved in methanol and reduced with sodium borohydride in the usual manner to yield the crude title compound. Distillation yielded the pure title compound, B.P. 228°/0.1 mm. It is a mixture of the Δ$^6$ and Δ$^7$-octenyl derivatives. A dihydrochloride salt was prepared and crystallized from ethanol. It had M.P. >320° C.

Analysis confirmed the empirical formula $C_{28}H_{56}N_2Cl_2$.

EXAMPLE 10

*N,N'-dicyclohexyl-trans-1,4-cyclohexanedicarboxamide*

Trans-1,4-cyclohexanedicarbonyl chloride (10.0 gm., 0.048 mole) was added to cyclohexylamine (19.6 gm., 0.2 mole) in 200 ml. of benzene. The mixture was refluxed for 5 hours and on cooling, a precipitate was obtained. It was separated by filtration and triturated with water. The insoluble portion was crystallized from dimethylformamide to yield the pure title compound. It had M.P. >360° C.

Analysis confirmed the empirical formula $C_{20}H_{34}N_2O_2$.

EXAMPLE 11

*N,N'-dicyclohexyl-trans-1,4-cyclohexane bismethylamine*

The diamide of Example 10 (15.0 gm., 0.045 mole) was added portionwise to a slurry of lithium aluminium hydride (5.12 gm.) in 200 ml. of tetrahydrofuran. The mixture was refluxed for 24 hours, cooled and treated cautiously with 21.3 ml. of water. The precipitated salts were removed by filtration and the filtrate concentrated to yield the title compound, M.P. 80–85° C.

The dihydrochloride salt was prepared with ethereal hydrogen chloride and crystallized from methanol. It had M.P. >360° C.

Analysis confirmed the empirical formula $C_{20}H_{40}N_2Cl_2$.

EXAMPLE 12

*Cyclohexane-trans-1,4-bis(N,N'-hexamethylene-carboxamide*

Trans-1,4-cyclohexanedicarbonyl chloride (10.0 gm.) and hexamethyleneimine (19.8 gm.) were reacted together as described in Example 10. On cooling a precipitate was obtained. It was discarded and the filtrate evaporated to yield a solid. It was crystallized from methanol to yield the title compound. It had M.P. 183–184° C.

Analysis confirmed the empirical formula $C_{20}H_{34}N_2O_2$.

EXAMPLE 13

*Trans-1,4-bis(hexamethyleneiminomethyl)-cyclohexane*

The diamide of Example 12 (16.6 gm., 0.05 mole) was reduced with lithium aluminium hydride (5.7 gm.) as described in Example 5 to yield the title compound as an oil. It had bands in the infra red spectrum at 2920 cm.$^{-1}$ and 1455 cm.$^{-1}$. The dihydrochloride salt was prepared in the usual manner and crystallized from methanol. It had M.P. >360° C.

Analysis confirmed the empirical formula $C_{20}H_{40}N_2Cl_2$.

EXAMPLE 14

*N,N'-di(cyclohexanepropionyl)-cyclohexane-1,4-bis-methylamine*

Cyclohexane-1,4-bismethylamine (20.8 gm.) dissolved in water (100 ml.) containing sodium hydroxide (11.8 gm.) was added to cyclohexane-propionylchloride (51.3 gm.) while maintaining the temperature below 70° C. After refluxing for 2 hours, the mixture was cooled and the precipitated amide isolated by filtration. It was washed with water and crystallized from methanol to yield the title compound, M.P. 220–221° C.

Analysis confirmed the empirical formula $C_{26}H_{46}N_2O_2$.

EXAMPLE 15

*N,N'-di(cyclohexanepropyl)-cyclohexane-1,4-bismethyl-amide*

The diamide of Example 14 (15.5 gm.) was added to a suspension of lithium aluminium hydride (5.4 gm.) in 400 ml. of dioxane at 100° C. The mixture was refluxed for 19 hours. Water (22.8 ml.) was added and the precipitated salts removed by filtrate. The filtrate was freed of dioxane to yield the title compound as a solid, M.P. 50–60° C. The dihydrochloride salt was prepared and crystallized from methanol. It had M.P. >310° C.

Analysis confirmed the empirical formula $C_{26}H_{52}N_2Cl_2$.

EXAMPLE 16

*Trans-1,4-bis(cyclopentylaminomethyl)-cyclohexane*

Trans-1,4-bisaminomethylcyclohexane (0.1 mole) and cyclopentanone (0.2 mole) were converted to the Schiff base by the process of Example 1. It was reduced with an excess of sodium borohydride to the title compound M.P. 50–53° C. The dihydrochloride was crystallized from a methanol-ether mixture, M.P. >325° C. Analysis confirmed the empirical formula $C_{18}H_{36}N_2Cl_2$.

EXAMPLE 17

*Trans-1,4-bis[1-(bicyclo(2,2,1)heptyl)-aminomethyl]-cyclohexane*

Trans-1,4-bisaminomethylcyclohexane (0.05 mole) and norcamphor (0.1 mole) were converted to the corresponding Schiff base by the process of Example 1. It was reduced with excess sodium borohydride to the title compound, M.P. 105–107° C. The dihydrochloride salt was crystallized from a methanol ether mixture and had M.P. >325° C. Analysis confirmed the empirical formula $C_{22}H_{40}N_2Cl_2$.

EXAMPLE 18

*Trans-1,4-bis(1-cyclohexenecarbamidomethyl)-cyclohexane*

1-cyclohexenecarbonylchloride (prepared from the acid and thionyl chloride) (24.4 gm., 0.194 mole) was added dropwise, to a benzene solution of trans-1,4-bisaminomethylcyclohexane (16.5 gm.). The mixture was refluxed with stirring for 4 hours. On cooling and filtration a solid was obtained which, after trituration with water to remove hydrochloride salts, yielded the crude title compound. It was crystallized from methanol and had M.P. 197–200° C. Analysis confirmed the empirical formula $C_{22}H_{34}N_2O_2$.

EXAMPLE 19

*Trans-1,4-bis(1-cyclohexenylmethylaminomethyl) cyclohexane*

Trans - 1,4-bis(1-cyclohexenecarbamidomethyl)-cyclohexane (8 gm.) was reduced with excess lithium aluminum hydride in refluxing ether. The mixture was worked up as described in Example 3 to yield the title compound as a yellow oil. The diacetate salt was crystallized from methanol-ether, M.P. 161–163° C. Analysis confirmed the empirical formula $C_{26}H_{46}N_2O_4$.

EXAMPLE 20

*Trans-1,4-bis(3-methylcyclohexylaminomethyl)-cyclohexane*

The title compound was prepared by the method of Example 1 with an excess of sodium borohydride and the Schiff base formed from 0.1 mole of 3-methylcyclohexanone and 0.05 mole of trans-1,4-bisaminomethylcyclohexane. It was an oil, λ max. 1460 cm.$^{-1}$. The diacetate salt was crystallized from a methanol-ether mixture and had M.P. 195–197° C. Analysis confirmed the empirical formula $C_{26}H_{50}N_2O_4$.

EXAMPLE 21

*Trans-1,4-bis(4-methylcyclohexylaminomethyl)-cyclohexane*

0.5 mole of trans-1,4-bisaminomethylcyclohexane and 0.1 mole of 4-methylcyclohexanone were converted to the corresponding Schiff base by the process of Example 1. It was reduced with an excess of sodium borohydride to yield the title compound as a semi-solid. The dihydrochloride salt, crystallized from ethanol, had M.P. >330° C. and its emperical formula $C_{22}H_{44}Cl_2N_2$ was confirmed by analysis.

EXAMPLE 22

*N,N'-di[2-(bicyclo[2.2.1]hept-5-enyl)methyl]-cyclo-hexane-trans-1,4-dicarboxamide*

Cyclohexane - trans - 1,4-dicarbonylchloride (prepared from the diacid and thionyl chloride) (16.88 gm., 0.08 mole) was added in small portions to a solution of 2-aminomethylbicyclo[2.2.1]-5-heptene (33.5 gm., 0.32 mole) in 200 ml. of benzene. The mixture was stirred for 30 mins. until the exothermic reaction was complete. Solvent was removed in vacuo and the residue triturated with water 2 x 200 ml.). The residual waxy solid was crystallized from 1 l. of ethanol-water (1:1) to yield the title product, M.P. 302–307° C. Analysis confirmed the empirical formula $C_{24}H_{34}N_2O_2$.

EXAMPLE 23

*Trans-1,4-bis[2-bicyclo[2.2.1]-hept-5-enyl-methylamino-methyl]cyclohexane*

The diamide of Example 22 (15.7 gm., 0.04 mole) was reduced in tetrahydrofuran (200 ml.) with lithium aluminum hydride (13.2 gm., 0.4 mole) by refluxing for 20 hours. The mixture was worked up in the usual manner and the title product, a yellow oil, λ max. 1450 and 660 cm.$^{-1}$ was converted to the dihydrochloride salt. Crystallization from a methanol-ether (2:1) mixture yielded the pure salt, M.P. >310° C., empirical formula $C_{24}H_{40}Cl_2N_2$ confirmed by analysis.

EXAMPLE 24

*Trans-1,4-bis[2-(bicyclo[2.2.1]-heptyl)-methylamino-methyl]cyclohexane*

The diolefin of Example 23 (5.2 gm., 0.015 mole) was hydrogenated in ethanol (100 ml.) at atmospheric pressure with platinum oxide (500 mg.). Uptake of hydrogen was complete in 20 min. and the mixture was worked up to yield the title compound as an oil which solidifies, M.P. 35–36° C. The dihydrochloride was crystallized from ethanol, M.P. >310° C. Analysis confirmed the empirical formula $C_{24}H_{44}N_2Cl_2$.

EXAMPLE 25

*N,N'-di-(3,7-dimethyloctylaminomethyl)-cyclohexane*

Citral (52.7 gm., 0.35 mole) and 1,4-bisaminomethyl cyclohexane (24.6 gm., 0.17 mole) were converted to the Schiff base by the method of Example 1. It was obtained as an oil and was reduced directly with sodium borohydride (14.7 gm., 0.38 mole) in methanol solution. On distillation, the product had B.P. 225° C./0.5 mm. and consumed the theoretical amount of hydrogen at atmospheric pressure with Adams catalyst in glacial acetic acid. The acetic acid was removed in vacuo, the residue dissolved in water, made alkaline and extracted with chloroform to yield the title compound as a yellow oil. The dihydrochloride salt was prepared and crystallized from methanol. It had M.P. >310° C. Analysis confirmed the empirical formula $C_{28}H_{60}N_2Cl_2$.

EXAMPLE 26

*N,N'-di-(t-butyl)-trans-1,4-cyclohexanedicarboxamide*

Trans-1,4-cyclohexanedicarbonyl chloride (prepared from 17.2 gm. of the diacid with thionyl chloride) and t-butylamine (29.2 gm.) were converted to the title product by the method of Example 10. On crystallization from a methanol-water mixture it had M.P. >310° C. and its empirical formula $C_{16}H_{30}N_2O_2$ was confirmed by analysis.

EXAMPLE 27

*N,N'-di-(t-butyl)-trans-1,4-cyclohexanedimethylamine*

The diamide of Example 26 (17.2 gm.) and lithium aluminum hydride (13.2 gm.) were reacted in tetrahydrofuran by the process of Example 11. The title product was obtained as an oil. The dihydrochloride salt was crystallized from a methanol-ether mixture and had M.P. >310° C. The empirical formula $C_{16}H_{36}Cl_2N_2$ was confirmed by analysis.

EXAMPLE 28

*N,N'-di-(t-octyl)-trans-1,4-cyclohexanedicarboxamide*

By following the method of Example 26 but using t-octylamine, the title product was obtained. It was crystallized from a methanol-water mixture and had M.P. 231–233° C. The empirical formula $C_{24}H_{46}N_2O_2$ was confirmed by analysis.

EXAMPLE 29

*N,N'-di-(t-octyl)-trans-1,4-cyclohexanedimethylamine*

The diamine of Example 28 (19.7 gm.) was reduced with lithium aluminum hydride (13.2 gm.) by the process of Example 11. The title product was obtained as an oil. The dihydrochloride salt was crystallized from methanol-ether, M.P. >340° C., and its empirical formula $C_{24}H_{52}Cl_2N_2$ was confirmed by analysis.

EXAMPLE 30

*N,N'-di-(cyclobutanecarbonyl)-trans-1,4-bisaminomethylcyclohexane*

Trans-1,4-bisaminomethylcyclohexane (14.2 gm.), cyclobutanecarbonyl chloride (prepared from 25 gm. of the acid with thionyl chloride) and sodium hydroxide (10.0 gm.) were reacted according to the method of Example 4 to yield the title compound, M.P. 246–247° C. (methanol), empirical formula $C_{18}H_{30}N_2O_2$ confirmed by analysis.

EXAMPLE 31

*N,N'-di-(cyclopentanecarbonyl)-trans-1,4-bisaminomethylcyclohexane*

By following the method of Example 30 but using cyclopentane carbonyl chloride, the title product was obtained, M.P. 264–265° C. (dec.) (methanol-water), empirical formula $C_{20}H_{34}N_2O_2$ confirmed by analysis.

EXAMPLE 32

*Trans-1,4-bis-(cyclobutylmethylaminomethyl)-cyclohexane*

The diamide of Example 30 (4.1 gm.) and lithium aluminum hydride (3.3 gm.) were reacted in tetrahydrofuran by the method of Example 11 to yield the title product as an oil. The dihydrochloride salt was crystallized from a methanol-ether mixture and had M.P. >310° C. The empirical formula $C_{18}H_{36}Cl_2N_2$ was confirmed by analysis.

EXAMPLE 33

*Trans-1,4-bis-(cyclopentylmethylaminomethyl)-cyclohexane*

The diamide of Example 31 (6.3 gm.) and lithium aluminum hydride (3.3 gm.) were reacted in tetrahydrofuran as described in Example 11. The title product was obtained as an oil and the dihydrochloride salt had M.P. >310° C. on crystallization from a methanol-ether mixture. The empirical formula $C_{20}H_{40}Cl_2N_2$ was confirmed by analysis.

EXAMPLE 34

*N,N' - di-cycloheptyl-trans-1,4-cyclohexanedicarboxamide*

Cycloheptylamine (17.5 gm.) and trans-1,4-cyclohexanedicarbonyl chloride (10.0 gm.) (from the acid and thionyl chloride) were reacted in benzene by the method of Example 10 to yield the title product, M.P. >360° C. (dimethylformamide). The empirical formula $$C_{22}H_{38}N_2O_2$$

was confirmed by analysis.

EXAMPLE 35

*Trans-1,4-bis-(cycloheptylaminomethyl)-cyclohexane*

The diamide of Example 34 (16.0 gm.) and lithium aluminum hydride (4.9 gm.) were reacted in tetrahydrofuran according to the method of Example 11. The title product was obtained as a semi-solid. The dihydrochloride salt was crystallized from methanol and had M.P. >360° C. Analysis confirmed the empirical formula $C_{22}H_{44}Cl_2N_2$.

EXAMPLE 36

*Trans-1,4-cyclohexanediacetic acid* 

Trans-1,4-cyclohexanediacetonitrile (2.0 gm., Haggis and Owen, J. Chem. Soc. 404, 1953), and sodium hydroxide (2.0 gm.) were refluxed in 80 ml. of a 3:1 ethyleneglycol:water mixture for 24 hours. It was cooled, poured into water (100 ml.) and acidified to pH 2.0 with 5% hydrochloric acid and filtered to yield the title compound, M.P. 288–230° C. recrystallized twice from isopropanol to M.P. 229–230° C. Analysis confirmed the empirical formula $C_{10}H_{16}O_4$.

EXAMPLE 37

*N,N'-dicyclohexyl-trans-cyclohexane-,14-bisacetamide*

Trans-1,4-cyclohexanediacetylchloride (prepared from the diacid and thionyl chloride) (21.3 gm., 0.09 mole) was reacted in refluxing benzene for 4 hours with an excess of cyclohexylamine (35.7 gm., 0.36 mole). The solid in the reaction mixture was triturated with water and the residual solid washed with ether to yield the desired diamide, M.P. 310–312° C. which was crystallized from dimethylformamide. Analysis confirmed the empirical formula $C_{22}H_{38}N_2O_2$.

EXAMPLE 38

*Trans-1,4-bis-(cyclohexylaminoethyl)-cyclohexane*

The diamide of Example 37 (12.5 gm.) was refluxed in dioxane with lithium aluminum hydride (4.0 gm.) for 24 hours. The reaction was worked up in the usual manner to yield a product that was only partially reduced. It was treated further with lithium aluminum hydride (2.0 gm.) in ether by the Soxhlet technique to yield, after the usual work up procedure, the title compound, M.P. 113–120° C. The diacetate salt was crystallized from an isopropanol-ether mixture and had M.P. 189–191° C. Analysis confirmed the empirical formula $C_{26}H_{50}N_2O_4$.

EXAMPLE 39

*Trans-1,4-bis-(2-hydroxycyclohexylaminomethyl)-cyclohexane (high and low melting forms)*

Trans-1,4-bis-(aminomethyl)-cyclohexane (14.2 gm.) and 2-hydroxycyclohexanone (22.8 gm.) were combined in benzene (200 ml.) and refluxed for 6 hours with continuous removal of the liberated water by azeotropic distillation to yield the corresponding Schiff base. It was reduced with sodium borohydride (5.0 gm.) in methanol solution. The methanol was removed and the residue triturated with water to remove inorganic salts. The solid residue was extracted with ether to yield a low-melting ether soluble form of the title product. It was crystallized from ethylacetate and had M.P. 137–141° C., empirical formula $C_{20}H_{38}N_2O_2$ confirmed by analysis.

The ether insoluble portion of the residue yielded a high-melting form of the title product, M.P. 191–197° C. (methanol), empirical formula $C_{20}H_{38}N_2O_2$ confirmed by analysis.

EXAMPLE 40

*1,4-bis-(3 and 4-bromocyclohexylmethylaminomethyl)-cyclohexane dihydrobromide*

The di-olefin of Example 6 (5.0 gm.) was dissolved in glacial acetic acid (100 ml.) and anhydrous hydrogen bromide was passed through the solution for 15 minutes. The mixture was stirred and refluxed for 10 hours. The insoluble material was separated and crystallized from water to yield a mixture of the title compounds, M.P. >360° C. The empirical formula $C_{22}H_{42}N_2Br_4$ was confirmed by analysis.

EXAMPLE 41

*N,N'-dicyclohexyl-trans-1,4-cyclohexanebismethylamine*

A solution of trans-1,4-bis-(aminomethyl)-cyclohexane (14.2 gm.) and cyclohexanone (19.6 gm.) in benzene (20 ml.) was refluxed for 4 hours. The resultant Schiff base was dissolved in methanol and refluxed for four hours with sodium borohydride (7.5 gm.). The reaction was worked up in the usual manner to yield the title compound, identical to that described in Example 11. The dihydrochloride salt was prepared and was identical to that of Example 11.

I claim:
1. 1,4-bis(cyclohexylmethylaminomethyl) - cyclohexane.
2. N,N'-dicyclohexyl-1,4-cyclohexane-bismethylamine.
3. 1,4 - bis(3 - cyclohexenylmethylaminomethyl)cyclohexane.
4. 1,4-bis(cyclopentylaminomethyl)-cyclohexane.
5. 1,4-bis[2-(bicyclo[2.2.1]-hept-5-enyl) - methylaminomethyl]-cyclohexane.
6. 1,4 - bis(4 - methylcyclohexylaminomethyl)-cyclohexane.
7. 1,4-bis-(cycloheptylaminomethyl)-cyclohexane.
8. The hydrochloric acid salt of 1,4-bis(cyclohexylmethylaminomethyl)-cyclohexane.
9. The hydrochloric acid salt of N,N'-dicyclohexyl-1,4-cyclohexane-bismethylamine.
10. The hydrochloric acid salt of 1,4-bis(3-cyclohexenylmethylaminomethyl)cyclohexane.
11. The hydrochloric acid salt of 1,4-bis(cyclopentylaminomethyl)-cyclohexane.
12. The hydrochloric acid salt of 1,4-bis[2-(bicyclo[2.2.1]-hept-5-enyl)-methylaminomethyl] - cyclohexane.
13. The hydrochloric acid salt of 1,4-bis(4-methylcyclohexylaminomethyl)-cyclohexane.
14. The hydrochloric acid salt of 1,4-bis-(cycloheptylaminomethyl)-cyclohexane.

References Cited by the Examiner

McMillan et al.: "Journal American Chemical Society," vol. 78, page 4077 (1956).

CHARLES B. PARKER, *Primary Examiner*.